United States Patent

Weller

[15] 3,703,678

[45] Nov. 21, 1972

[54] ISOLATING POWER SUPPLY

[72] Inventor: David Reis Weller, Bernardsville, N.J.

[73] Assignee: Bell Telephone Laboratories, Inc., Murray Hill, Berkeley Heights, N.J.

[22] Filed: May 12, 1971

[21] Appl. No.: 142,628

[52] U.S. Cl.......................323/19, 323/22 T, 323/23, 340/147 R

[51] Int. Cl...................................................G05f 3/14

[58] Field of Search..340/147, 151; 307/52, 60, 296, 307/297; 323/1, 4, 16, 19, 22 T, 23

[56] References Cited

UNITED STATES PATENTS

| | | | |
|---|---|---|---|
| 3,628,127 | 12/1971 | Waldhauer | 323/22 T |
| 3,174,095 | 3/1965 | Cocker | 323/22 T |
| 3,340,404 | 9/1967 | Willems et al | 323/22 T |
| 3,518,457 | 6/1970 | Herrmann et al | 307/297 |

*Primary Examiner*—A. D. Pellinen
*Attorney*—R. J. Guenther and William L. Keefauver

[57] ABSTRACT

An isolating power supply having direct-current power as its input and providing a direct-current output having a ground that is independent of the input power lines.

4 Claims, 2 Drawing Figures

INVENTOR
D. R. WELLER
BY
R. O. Nimtz
ATTORNEY

ISOLATING POWER SUPPLY

BACKGROUND OF THE INVENTION

1. Field of the Invention

This invention relates to power supplies and, more particularly, to direct-current power supplies.

2. Description of the Prior Art

A common problem in all types of electrical circuits is the generation and propagation of unwanted signals which are commonly termed "noise." The types and causes of noise are as varied as the types of electrical circuits themselves. One cause of noise which is well known to the art occurs in large electrical systems due to different grounds in the system, that is, different points in the system which are nominally at the same potential level, but which in fact have a potential difference between them. This difference in potential allows spurious currents to flow from point to point in an uncontrolled manner.

One particular type of system in which varying ground or reference potential levels can present a difficult problem is a loop communication system. Such a system typically involves a source of central control connected in series with a plurality of local user stations, each station having connected to it a user device such as a teletypewriter, a display console, a digital-to-analog converter, et cetera. These systems are illustrated, for example, by the data handling system and method disclosed in U.S. Pat. No. 3,456,242, granted to S. Lubkin et al. July 15, 1969, and the multiplex loop system disclosed in U.S. Pat. No. 3,483,329, granted to S. H. Hunkins et al. on Dec. 9, 1969.

It is often a desirable feature in loop communication systems to insure that communication can continue even if one or more stations attached to the loop is not in operation. One way of insuring this is to provide direct-current (d-c) system power in parallel to each station, thereby allowing it to be energized irrespective of the condition of the associated user device. Obviously, the length of the ground loop that would have to be provided would be extremely susceptible to the aforementioned noise problems, even if only the actual voltage drop of the line itself were considered. What is needed, then, in such a system is a means for coupling the system power to an individual station in such a manner that the ground level at the station is completely isolated from the ground level at any of the other stations.

Therefore, it is an object of this invention to provide a power supply which takes as its input a d-c source of power and which supplies as its output a d-c voltage which is referenced to a ground that is independent of the d-c input.

It is another object of this invention that the power supply be capable of supplying an output voltage that is substantially independent of the voltage swings of the input voltage with respect to the independent ground.

It is a further object of this invention that the power supply be capable of using a floating input voltage to supply its floating output voltage so as to prevent excessive loading of either side of the input.

It is a specific object of this invention to provide a power supply for use in a loop communication system in which d-c power is supplied in parallel to each local station on the loop; the power supply having an output voltage that is floating with respect to its input voltage and is referenced to the ground potential existing at the local station.

SUMMARY OF THE INVENTION

These objects are achieved in accordance with this invention through the provision of two emitter-followers, each of which acts as a constant voltage source and serves to couple an input line to an output line. The voltage level of the base of each of the emitter-followers is determined by a separate bias-voltage source. Each of these bias-voltage sources is connected to the reference ground and each is in turn controlled by a constant-current source.

DETAILED DESCRIPTION

Figure 1:
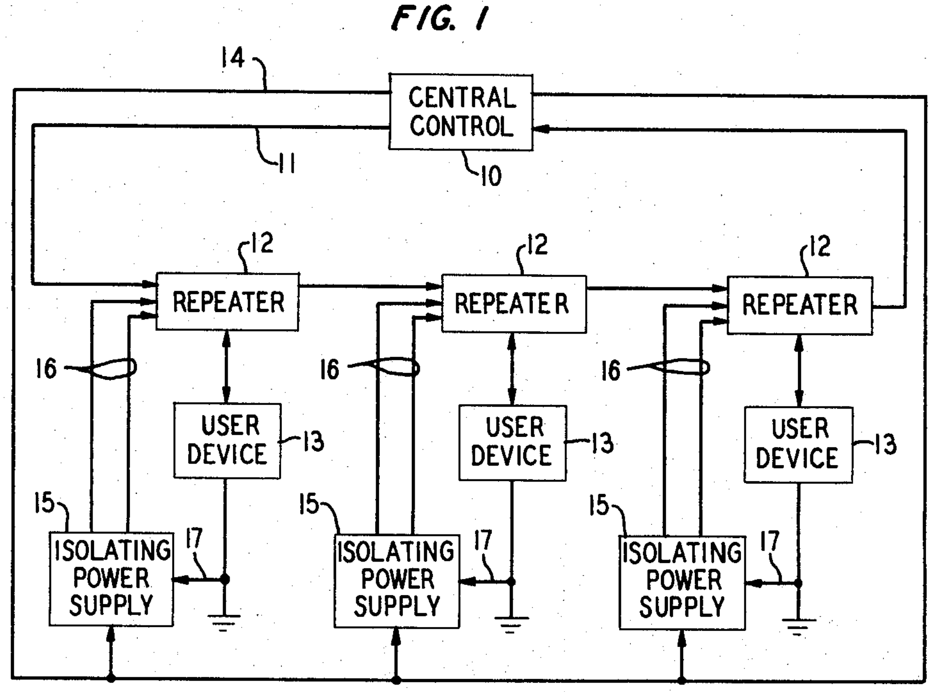
FIG. 1 is a generic diagram showing the type of system in which the isolating power supply of this invention can be used.

The isolating power supply of this invention can be used in a loop communication system in the manner shown in FIG. 1. As shown in FIG. 1, a central control 10 is attached by means of communication loop 11 to a plurality of repeaters 12. Each repeater 12 has a user device 13 attached to it. The repeaters 12 serve to transmit information around the loop 11 as well as to and from loop 11 and user devices 13. Thus, depending upon the exact nature of central control 10, intercommunication between various ones of the digital devices 13 and the central control 10 can be achieved. System d-c power is supplied from central control 10 by means of line 14 to which a plurality of isolating power supplies 15 are attached in parallel. Line 14 may comprise, for example, a twisted pair. The system d-c power may be supplied by a pair of power supplies, one positive and one negative. Each isolating power supply 15 supplies d-c power to its associated repeater 12 by means of lines 16. In addition, line 17 serves as the local station ground, with each such ground being independent of all of the others.

Figure 2:
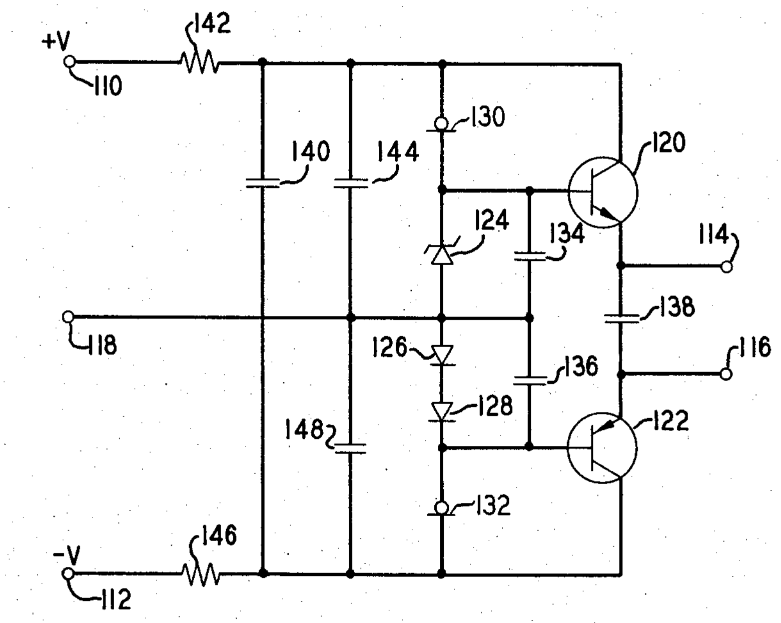
FIG. 2 is a detailed circuit diagram of the isolating power supply of this invention.

The schematic diagram of the isolating power supply 15 of FIG. 1 is shown in FIG. 2. The source of d-c input power shown as line 14 in FIG. 1 is applied to terminals 110 and 112 shown in FIG. 2. The isolating power supply output shown as line 16 in FIG. 1 is derived from output terminals 114 and 116 shown in FIG. 2. The local station ground shown as line 17 in FIG. 1 corresponds to terminal 118 shown in FIG. 2.

The purpose of the circuit of FIG. 2 is to provide a d-c output voltage that is constant with respect to the ground reference potential appearing on terminal 118. This constant relationship is to be maintained irrespective of fluctuations in the relative potential differences between input terminal 110 and reference ground at terminal 118, and between input terminal 112 and reference terminal 118. This result is achieved by means of the operation of the circuit of FIG. 2 in the following manner.

Transistors 120 and 122 function as emitter-followers. As is well know, the voltage on the emitter of a transistor in the emitter-follower connection is equal to the voltage appearing on its base minus the base-emitter drop. It can thus be seen that transistors 120 and 122 act as constant voltage sources to drive the output terminals 114 and 116, respectively. This means that the load on the output of the isolating power supply can draw varying amounts of current without affecting the output voltage.

In order to facilitate the further detailed discussion, it will be assumed that the components shown in FIG. 2 have the particular values listed below in Table I.

TABLE I

| Component | Value |
|---|---|
| Transistor **120** | 2N 3643 |
| Transistor **122** | 2N 3645 |
| Zener Diode **124** | IN 4734 |
| Diode **126** | HP 2800 |
| Diode **128** | FD 333 |
| Constant-Current Source **130** | IN 5305 |
| Constant-Current Source **132** | IN 5305 |
| Capacitor **134** | 0.22 microfarads |
| Capacitor **136** | 0.22 microfarads |
| Capacitor **138** | 0.22 microfarads |
| Capacitor **140** | 0.22 microfarads |
| Resistor **142** | 10 ohms |
| Capacitor **144** | 0.22 microfarads |
| Resistor **146** | 10 ohms |
| Capacitor **148** | 0.22 microfarads |
| +V | +15 volts |
| −V | −15 volts |

The voltage seen by the base of transistor 120 is determined by Zener diode 124, while the voltage seen by the base of transistor 122 is determined by the sum of the forward voltage drops of diodes 126 and 128. In order to insulate the output voltage from fluctuations between the input and the reference ground at terminal 118, it is necessary to maintain the voltages appearing across Zener 124 and across diodes 126, 128 at constant values. This is done through the use of constant-current sources 130 and 132. Subject to the device limitations discussed below, these constant-current sources maintain the voltage drops across Zener 124 and across diodes 126 and 128 at constant values by maintaining the current through them at a constant value.

Both of constant-current sources 130 and 132 are required because a constant-current source is needed on each side of reference ground terminal 118. This is true because otherwise the movement of terminal 118 toward either of the input terminals would affect the amount of current flowing in that branch of the circuit and hence change the diode voltage drops. For example, if the voltage level at reference ground terminal 118 moved toward that at input terminal 112, this could change the current flow through diodes 126 and 128 if constant-current source 132 were not present. Similarly, if the voltage level at reference ground terminal 118 moved towards that at input terminal 110, this could serve to shut off the Zener diode 124, if constant-current source 130 were absent.

The operation of the circuit is thus limited by the operating requirements of constant-current sources 130 and 132. These devices are commercially available components. The particular ones listed in Table I actually comprise a field effect transistor with its gate and drain terminals connected together. As long as the drain-source voltage is in the range of 2 to 100 volts the transistor will be in its constant-current region and it will furnish a constant two milliampere current. Thus, if, as shown in Table I, the +V volts appearing on input terminal 110 is +15 volts, then the actual voltage level of the reference ground on terminal 118 can vary between −13 volts and +8 volts without affecting the isolating power supply's output voltage.

The two milliampere current output of constant-current sources 130 and 132 will, in accordance with the component values set forth in Table I, cause the voltage drop across Zener diode 124 to be 5.6 volts and the voltage drops across diodes 126 and 128 to be 0.6 volt and 0.2 volt, respectively. Hence, taking into consideration the base-emitter drop of transistors 120 and 122, which for the particular transistors listed in Table I is 0.6 volt, it can be seen that the voltage appearing on output terminal 114 is +5 volts with respect to reference ground terminal 118, while the voltage appearing on output terminal 116 is −0.2 volt with respect to reference ground terminal 118. Setting the voltage level of output terminal 116 at 0.2 volt below the reference ground serves to provide a better noise margin.

Turning then to the remaining circuit components, capacitor 138 serves to smooth the output voltage for rapidly varying loads appearing on terminals 114 and 116. Capacitors 134 and 136 serve both to aid in the elimination of any noise generated in the isolating power supply itself, and to prevent oscillations from occurring in the emitter-followers. Capacitor 140 in combination with resistors 142 and 146 serves to shunt any noise appearing on input terminals 110 and 112. The combination of resistor 142 and capacitor 144 serves to shunt any noise appearing between input terminal 110 and device reference ground 118, while the combination of resistor 146 and capacitor 148 similarly serves to shunt any noise appearing between output terminal 112 and reference ground terminal 118.

The isolating power supply comprising this invention which is shown schematically in FIG. 2 can be implemented using a variety of components other than those set forth in Table I. The particular component values chosen in any individual implementation will depend upon the desired values of input voltage, output voltage, and estimated reference ground fluctuation. The substitution of appropriate components for those set forth in Table I in order to achieve such desired values will be obvious to those of ordinary skill in the art.

What is claimed is:

1. An isolating power supply adapted to transfer direct-current power from a pair of input power lines to a pair of output power lines, said output power lines being referenced to a ground that is independent of said input power lines, said isolating power supply comprising:

a first constant-voltage source for coupling a first one of said pair of input power lines to a first one of said pair of output power lines;

a first voltage-biasing means connected to said first constant-voltage source and to said reference ground;

a first constant-current source connected to said first voltage-biasing means and to said first one of said pair of input power lines for activating said first voltage-biasing means;

a second constant-voltage source for coupling the second one of said pair of input power lines to the second one of said pair of output power lines;

a second voltage-biasing means connected to said second constant-voltage source and to said reference ground; and a second constant-current source connected to said second voltage-biasing means and to said second one of said pair of input power lines for activating said second voltage biasing means.

2. The isolating power supply of claim 1 wherein both of said first and said second constant-voltage sources comprise emitter-followers.

3. The isolating power supply of claim 2 wherein said first voltage-biasing means comprises a Zener diode and said second voltage-biasing means comprises two diodes connected in series.

4. A direct-current isolation circuit comprising:

a first transistor biased in its base-emitter circuit by a first bias voltage source energized from a first constant-current source;

a second transistor biased in its base-emitter circuit by a second bias voltage source energized from a second constant-current source; and a capacitor coupling the emitters of said first and second transistors.

* * * * *